United States Patent
Bradski

(10) Patent No.: US 6,647,131 B1
(45) Date of Patent: Nov. 11, 2003

(54) MOTION DETECTION USING NORMAL OPTICAL FLOW

(75) Inventor: Gary R. Bradski, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/384,462

(22) Filed: Aug. 27, 1999

(51) Int. Cl.$^7$ ................................................ G06K 9/00
(52) U.S. Cl. .................. 382/107; 348/700; 382/199; 382/236
(58) Field of Search ................... 382/100, 103, 382/128, 133, 168–172, 218–219, 232, 236, 107, 199; 342/64; 345/473, 474; 348/239, 700; 375/240.16

(56) References Cited

U.S. PATENT DOCUMENTS

| | | | |
|---|---|---|---|
| 4,172,632 A | * 10/1979 | Holmes, Jr. | 359/465 |
| 4,937,878 A | 6/1990 | Lo et al. | 382/1 |
| 5,148,477 A | 9/1992 | Neely et al. | 382/6 |
| 5,287,437 A | 2/1994 | Deering | 395/127 |
| 5,327,161 A | 7/1994 | Logan et al. | 345/157 |
| 5,341,142 A | * 8/1994 | Reis et al. | 342/64 |
| 5,343,390 A | 8/1994 | Doi et al. | 392/132 |
| 5,394,202 A | 2/1995 | Deering | 353/7 |
| 5,446,834 A | 8/1995 | Deering | 395/127 |
| 5,570,177 A | 10/1996 | Parker et al. | 356/139.06 |
| 5,751,836 A | 5/1998 | Wildes et al. | 382/117 |
| 5,790,208 A | 8/1998 | Kwak et al. | 348/697 |
| 5,798,787 A | 8/1998 | Yamaguchi et al. | 348/152 |
| 5,801,704 A | 9/1998 | Oohara et al. | 345/358 |
| 5,802,220 A | 9/1998 | Black et al. | 382/276 |
| 5,805,165 A | 9/1998 | Thorne, III et al. | 345/348 |
| 5,805,733 A | 9/1998 | Wang et al. | 382/232 |
| 5,847,755 A | 12/1998 | Wixson et al. | 348/155 |
| 5,875,040 A | * 2/1999 | Matraszek et al. | 382/199 |
| 5,878,165 A | * 3/1999 | Ono | 382/199 |
| 5,923,776 A | 7/1999 | Kamgar-Parsi | 382/173 |
| 5,926,568 A | 7/1999 | Chaney et al. | 382/217 |
| 5,930,379 A | 7/1999 | Rehg et al. | 382/107 |
| 5,933,523 A | * 8/1999 | Drisko et al. | 382/199 |
| 5,936,610 A | 8/1999 | Endo | 345/157 |
| 5,988,645 A | * 11/1999 | Downing | 273/348 |
| 6,009,210 A | 12/1999 | Kang | 382/276 |
| 6,028,960 A | 2/2000 | Graf et al. | 382/203 |
| 6,070,003 A | 5/2000 | Gove et al. | 710/132 |
| 6,097,839 A | 8/2000 | Liu | 382/181 |
| 6,111,517 A | 8/2000 | Atick et al. | 340/825.34 |
| 6,127,990 A | 10/2000 | Zwern | 345/8 |
| 6,130,707 A | 10/2000 | Koller et al. | 348/155 |
| 6,192,078 B1 | 2/2001 | Komiya et al. | 375/240.16 |
| 6,211,882 B1 | * 4/2001 | Pearce et al. | 345/419 |
| 6,269,172 B1 | * 7/2001 | Rehg et al. | 382/103 |
| 6,317,139 B1 | 11/2001 | Williams | 345/634 |
| 6,330,523 B1 | * 12/2001 | Kacyra et al. | 702/159 |
| 6,400,831 B2 | 6/2002 | Lee et al. | 382/103 |
| 6,437,820 B1 | 8/2002 | Josefsson | 348/169 |

OTHER PUBLICATIONS

U.S. patent application Ser. No. 09/204,010, filed Dec. 1, 1998, Computer Vision Control Variable Transformation.

U.S. patent application Ser. No. 09/204,007, filed Dec. 1, 1998, Synthesizing Computer Input Events.

(List continued on next page.)

Primary Examiner—Jayanti K. Patel
(74) Attorney, Agent, or Firm—Schwegman Lundberg Woessner & Kluth, P.A.

(57) ABSTRACT

A system and method obtain images of an object and generate a motion region image of the object. The motion region image is processed to obtain normal gradients of the portion of the object that has been moved. The normal gradient data is further processed to remove erroneous data points. The erroneous data can be removed by using either an eroding method or a threshold method. After the erroneous data is removed, the remaining gradient information is used to identify a motion of the object. This can be performed using a histogram recognition operation.

19 Claims, 6 Drawing Sheets

OTHER PUBLICATIONS

U.S. patent application Ser. No. 09/235,139, filed Jan. 22, 1999, Interface Using Pattern Recognition and Tracking.

U.S. patent application Ser. No. 09/079,917, filed May 15, 1998, Method and Apparatus for Tracking an Object Using a Continuously Adapting Mean Shift.

U.S. patent application Ser. No. 09/470,115, filed Dec. 22, 1999, Motion Detection Using Normal Optical Flow.

"Workshop on Perceptual User Interfaces", The Banff Rocky Mountain Resort, Banff, Alberta, Canada http://research.microsoft.com/PUIWorkshop97/, 1 p., (Oct. 20–21, 1997).

Bradski, G.R., "Computer Vision Face Tracking For Use in a Perceptual User Interface", *Intel Technology Journal Q2*, 1–15 p., (1998).

Bradski, G.R., et al., "Computer Vision Modules for Game Interfaces and in Virtual Holography", *Workshop on Perceptual User Interfaces*, Banff, Alberta, Canada, pp. 10–13, (Oct. 19–21, 1997).

Cheng, Y., "Mean Shift, Mode Seeking, and Clustering", *IEEE Transactions on Pattern Analysis and Machine Intelligence*, 17 (8), pp. 790–799, (Aug. 1995).

Comaniciu, D., et al., "Robust Analysis of Feature Spaces: Color Image Segmentation", *Proceedings of the IEEE Computer Society Conference on Computer Vision and Pattern Recognition*, San Juan, Puerto Rico, pp. 750–755, (Jun. 17–19, 1997).

Cutler, L.D., et al., "Two–Handed Direct Manipulation on the Responsive Workbench", *Symposium on Interactive 3D Graphics*, pp. 107–114 (1997).

Cutler, R., et al., "View–based Interpretation of Real–time Optical Flow for Gesture Recognition", *Proceedings of the International Conference on Automatic Face and Gesture Recognition*, pp. 416–421, (1998).

Davis, J.W., et al., "The Representation and Recognition of Human Movement Using Temporal Templates", *Proceedings of the IEEE Computer Society Conference on Computer Vision and Pattern Recognition*, San Juan, Puerto Rico, pp. 928–934, (Jun. 17–19, 1997).

Freeman, W., et al., "Computer Vision for Interactive Computer Graphics", *IEEE Computer Graphics and Applications*, pp. 42–53, (May/Jun. 1998).

Freeman, W.T., et al., "Computer Vision for Computer Games", *Proceddings of the Second International Conference on Automatic Face and Gesture Recognition*, Killington, VT, pp. 100–105, (Oct. 14–16, 1996).

Fukunaga, K., *Introduction to Statistical Pattern Recognition, 2nd Edition*, Academic Press, Inc., Harcourt Brace Jovanovich, Publishers, pp. 1–591, (1990).

Funt, B.V., et al., "Color Constant Color Indexing", *IEEE Transactions on Pattern Analysis and Machine Intelligence*, 17 (5), pp. 522–529, (May 1995).

Nagao, K., "Recognizing 3D Objects Using Photometric Invariant", *Proceedings of the Fifth International Conference on Computer Vision*, Massachusetts Institute of Technology, Cambridge, Massachusetts, pp. 480–487, (Jun. 20–23, 1995).

Parker, J.R., *Algorithms for Image Processing and Computer Vision*, John Wiley & Sons, Inc., pp. 241–243, (1997).

Smith, A.R., "Color Gamut Transform Pairs", *Computer Graphics: A Quarterly Report of SIGGRAPH–ACM*, 12 (3), pp. 12–19, (Aug. 1978).

Swain, M.J., et al., "Color Indexing", *International Journal of Computer Vision*, 7 (1), pp. 11–32, (Nov. 1991).

Ward, M., et al., "A Demonstrated Optical Tracker with Scalable Work Area for Head–Mounted Display System", *Proceedings of the Symposium on Interactive 3D Graphics*, Cambridge, MA, pp. 43–52, (1992).

Yeo, B., et al., "Rapid Scene Analysis on Compressed Video", *IEEE Transactions on Circuits and Systems for Video Technology*, 5 (6), pp. 533–544, (Dec. 1995).

Yeo, B., et al., "Retrieving and Visualizing Video", *Communications of the ACM*, 40 (11), pp. 43–52, (Nov. 1997).

Yeung, M.M., et al., "Time–constrained Clustering for Segmentation of Video into Story Units", *Proceedings of the 13th International Conference on Pattern Recognition, III Track C: Applications and Robotic Systems*, Vienna, Austria, pp. 375–380, (Aug. 25–29, 1996).

Yeung, M.M., et al., "Video Browsing using Clustering and Scene Transitions on Compressed Sequences", *SPIE, 2417*, pp. 3994–413, (Feb. 1995).

* cited by examiner

MOTION DETECTION USING NORMAL OPTICAL FLOW

TECHNICAL FIELD OF THE INVENTION

The present invention relates generally to machine-human interface and in particular the present invention relates to motion detection.

BACKGROUND OF THE INVENTION

An increasing interest in the recognition of human motion and action using computer vision has appeared, with much emphasis on real-time computability. In particular, tracking/surveillance systems, human computer interfaces, and entertainment domains have a heightened interest in understanding and recognizing human movements. For example, monitoring applications may provide a signal only when a person is seen moving in a particular area (perhaps within a dangerous or secure area). Interface systems may be desired which understand gestures as a means of input or control, and entertainment applications may want to analyze the actions of the person to better aid in the immersion or reactivity of the experience.

In prior work, a real-time computer vision representation of human movement known as a Motion History Image (MHI) was presented. The MHI is a compact template representation of movement originally based on the layering of successive image motions. The recognition method presented for these motion templates used a global statistical moment feature vector constructed from image intensities, resulting in a token-based (label-based) matching scheme. Though this recognition method showed promising results using a large database of human movements, no method has yet been proposed to compute the raw motion information directly from the template without the necessity of labeling the entire motion pattern. Raw motion information may be favored for situations when a precisely labeled action is not possible or required. For example, a system may be designed to respond to leftward motion, but may not care if it was a person, hand, or car moving.

For the reasons stated above, and for other reasons stated below which will become apparent to those skilled in the art upon reading and understanding the present specification, there is a need in the art for a computer system for the representation and recognition of motion gestures.

SUMMARY OF THE INVENTION

In one embodiment, a method of detecting motion is provided which comprises obtaining a plurality of images of an object over a predetermined period of time, generating a motion region image of the object from the plurality of images, calculating normal gradients of the motion region image, removing erroneous normal gradients to provide a normal flow image, and identifying movement based on the normal flow image.

In another embodiment, a method of detecting motion is provided which comprises obtaining a plurality of images of an object using a camera. The plurality of images are obtained over a predetermined period of time. The method further comprises generating a motion region image of the object from the plurality of images by isolating the object in the plurality of images from a background, generating a difference image using the plurality of images, wherein the difference image isolates a portion of the object which has changed location during the plurality of images, and setting all pixels of the difference image to an equal value. Normal gradients of the motion region image are calculated, erroneous normal gradients are removed to provide a normal flow image, and movement is identified based on the normal flow image.

DETAILED DESCRIPTION OF THE INVENTION

Figure 1A:
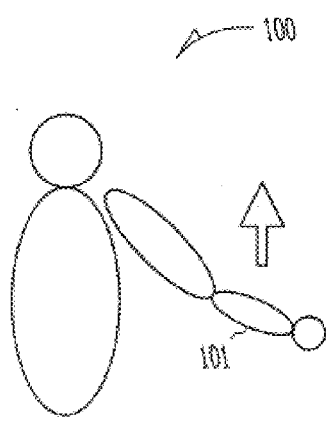
FIG. 1(a) illustrates an image of a foreground object.

In the following detailed description of the preferred embodiments, reference is made to the accompanying drawings that form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

As described in greater detail below, silhouettes of a moving person can be layered over time to form a Motion History Image (MHI) template. The idea is that the motion template itself implicitly encodes directional motion information along the layered silhouette contours. Motion orientations can then be extracted by convolving image gradient masks throughout the MHI. With the resulting motion field, various forms of motion analysis and recognition are possible.

Prior to describing the present invention, a description of prior motion template work is provided. In previous work, a real-time computer vision approach for representing and recognizing simple human movements was provided. The motivation for the approach was based on how easily people can recognize common human movements (like sitting or push-ups) from low-resolution (blurred) imagery. Here the image features are basically not perceivable, thus showing the role of motion for recognition. Accordingly, the method given relies on "patterns of motion" rather than on structural features as the representation for human motion. In that method, the space-time image volume containing the motion is collapsed into a single 2-D template, still perceptually capturing the essence of the movement and its temporal structure. The template is generated by layering successive image differences of a moving person, and is referred to as a Motion History Image (MHI).

For recognition of the templates, seven higher-order moments are initially extracted from the MHI and also from a binarized version of the MHI. These fourteen moments are used as global shape descriptors and temporal recency localizers for the MHI. The moments are then statistically matched to stored examples of different movements. This method of recognition has shown promising results using a large database of movements. But the main limitation is that characterization of the template is token (label) based (e.g. "crouching" or "sitting"), where it cannot yield much information other than recognition matches (i.e. it cannot determine that, say, a lot of "up" motion is currently happening).

The accumulation of object silhouettes in a motion template can yield useful motion information along the contours of a person, or object. The present invention uses a MHI representation and uses silhouettes instead of image differences as the basis for motion calculation. To acquire the silhouettes, several different methods can be used with the present invention. For example, full-body silhouettes of a person can be generated using a fast background subtracting method based on Red-Green-Blue (RGB) threshold differences. Then pixel erosion, dilation and region growing methods are applied to remove noise and extract the silhouette.

Other methods are applicable and may be desirable for more complex backgrounds, but this method was selected for simplicity and speed. One immediate limitation of using silhouettes is that no motion inside the region can be seen. For example, a silhouette generated from a camera facing a person would not show the hands moving in front of the body. One possibility to help overcome this problem is to simultaneously use multiple camera views. Another method is to further identify regions within the silhouette that share common texture or color characteristics.

The following sections provide a detailed description of a method according to one embodiment of the present invention for detecting normal optical flow from a motion history image. Normal optical flow identifies movement perpendicular to object boundaries. An approach according to one embodiment of the present invention for computing motion orientations from a silhouette-based motion template representation is provided. The method improves upon prior methods of approximation to optical flow in two areas: (1) eliminating spurious flow from boundary pixels, (2) using a faster metric to measure normal optical flow.

Figure 1B:
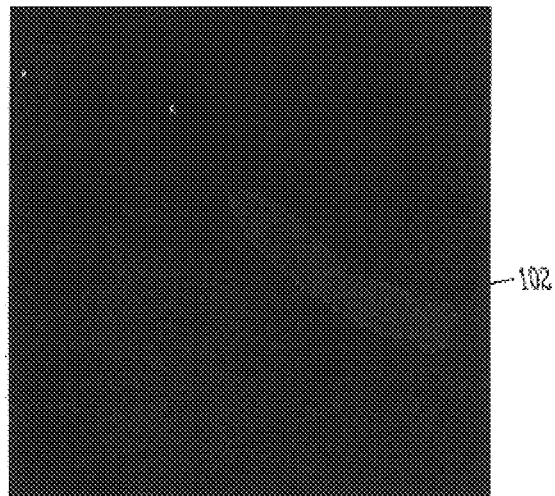
FIG. 1(b) illustrates a difference image based on the image of FIG. 1(a)

Pseudo Code is provided below for generating a suitable Motion History (MH) image for use with the present invention. To help explain the algorithms in the pseudo code, some definitions are first provided:

diffIm is an image created from frame, background differencing, selected image statistics, or other suitable method for isolating an object. An example is illustrated in FIG. 1(a) showing a person 100 and one arm 101. This image is referred to herein as the foreground image or object. When the foreground object moves, the movement from frame to frame may be recorded in an image such as shown in FIG. 1(b). This image illustrates the difference 102 between movements of the arm, and is referred to herein as a difference image.

Figure 1C:
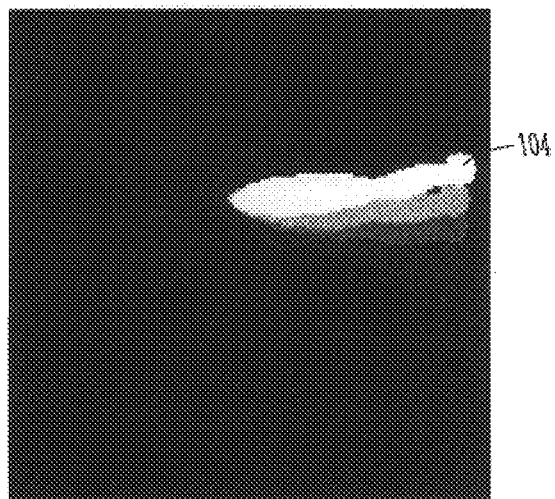
FIG. 1(c) illustrates a motion history image based on the image of FIG. 1(a)

A Motion History (MH) image is illustrated in FIG. 1(c) showing the movement of a person's arm. Successive frame difference or background difference images are used to code the motion from FIG. 1(a) into the motion history image 104 in FIG. 1(c). When a new difference image is available, all non-zero pixels in the MH image are decreased by one. Pixel values which are below a threshold, tau_min, are set to zero. The pixels from the most recent difference image are set to a high value, tau_max, in the MH image as shown in FIG. 1(c). Thus, the most recent motion as given by the most recent difference image has the highest value (tau_max) and older motion is coded by successively lower image values in the MH image. Time slices can come frame to frame, or from set periods of time, or be triggered by movement of the foreground object by more than a set threshold.

Figure 1D:
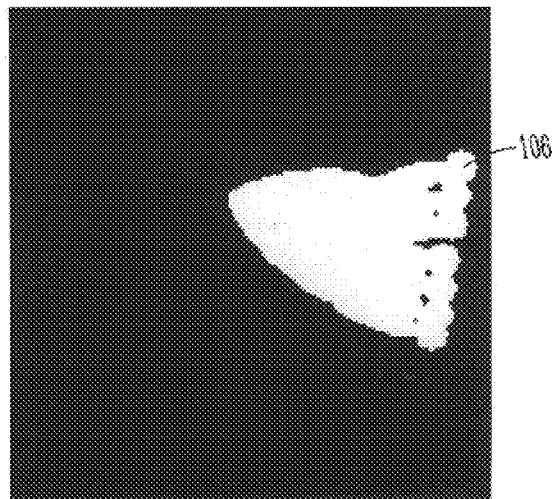
FIG. 1(d) illustrates a motion region image based on the image of FIG. 1(a)

A Motion Region (MR) silhouette 106 is illustrated in FIG. 1(d). A MR image is created by setting all the non-zero pixels in the MH image to a maximal gray scale value. For example, the image from FIG. 1(c) is turned into an MR image illustrated in FIG. 1(d).

A GRAYimage is a one channel gray scale image in pixel or planar order. Pixels types can be selected from known 8U, 8S, or 32F formats.

Tau_max is an integer pixel value of most recent input. As stated, all older inputs are decreased by 1 in value.

Tau_min is an integer pixel that is a low threshold value. Any pixels equal to or below this value are set to zero (Tau_max>tau_min).

WinLen is an integer number of previous time slices that a user wants to use for recognition purposes.

The following is one example of pseudo code that can be used with the present invention to provide MR images:

```
// To generate the MH (motion history) image from diffIm images:
// User note: The original MH image starts out as all zeroes.
void updateMH(GRAYimage& MH, GRAYimage& diffIm, int tau_max, int tau_min)
{
    int val;
    // look over the image
    for(int y=0;y<MH.getHeight( );y++)
        for(int x=0;x<MH.getWidth( );x++)
        {
            // see if new motion
            if(diffIm.getPixel(x,y)!=0)
            {
                // set MH image
                MH.setPixel(x,y, tau_max);
            }
            else if( (val = (MH.getPixel(x,y)-1) ) > tau_min) // old motion
            {
                // decrease old values
```

```
                MH.setPixel(x,y, val);
            }
            else
            {
                // motion too old, set to zero
                MH.setPixel(x,y, 0);
            }
        }
    }
}
// For gesture recognition, in order to compare the current MH image
// with stored models of gesture motion, we sometimes need to remove
// past time slices and then re-normalize the remaining slices for
// comparison.
//
// In this routine, we re-normalize the current motion back to "winLen"
// time slices. WinLen <= tau_max - tau_min.
// This routine is typically followed by Hu moment generation-
// re-normalization allows for more separable moment numbers.
void renormMH(GRAYimage& MR,
                        GRAYimage& normedMH,
                        int tau_max,
                     int winLen)
{
    int pix;
    int val;
    int cutoff = tau_max - winLen; // operate on values greater than this
    for(int y=0;y<MH.getHeight( );y++)
        for(int x=0;x<MH.getWidth( );x++)
        {
            // put MH value in range of 0..255
            if( (val=MH.getPixel(x,y)) > cutoff)
            {
                // renormalized value
                pix = (1.0 + (float)(val-tau_max)/(float)winLen)*255;
            }
            else
            {
                // wipe it out
                pix = 0;
            }
            // save that value
            normedMH.setPixel(x,y, pix);
        }
}
//Implementation Note:
//In the above routine, the calculation is fairly slow, a better way of doing it would be to
//calculate a look-up table of 256 values before entering the for loops.
//For more rapid comparison when re-normalization isn't need to create
//separable values, thresholding is all that is required.
Void thresholdMH(GRAYimage & MH, GRAYimage & threshMH, int thresh)
{
            cvlThresholdToZero(MH,threshMH,thresh);
}
```

An alternate method of generating MH images that has the advantage of reducing the dependency on CPU speed or frame rate is described next. Pixels from the most recent DiffIm are written into the MH image with values representing the current time in a floating point representation. All pixels in the MH image whose time stamp values are older than current time minus tau_delta are set to zero. There is then no need for the renormMH and thresholdMH functions and the updateMH function becomes:

```
//Use timestamps to update Motion History Image
Void updateMH(GRAimage& MH, GRAYimage& diffIm,
float current_time,
              float tau_delta)
{
float too_old = current_time - tau_delta;
//look over the image
for(int y=0; y<MH.getHeight( ); y++)
    for(int x=0; x<MH.getWidth( ); x++)
    {
        //see if new motion
        if(diffIm.getPixel(x,y) != 0)
        {
            //set MH image
            MH.setPixel(x,y,current_time);
        }
        else if(MH.getPixel(x,y) < too_old)
        {
            //zero out values too old
            MH.setPixel(x,y,0);
        }
    }
}
```

The above described methods are example ways of creating an MH image that can be used to detect motion with the present invention, and other methods can also be used.

Figure 2:
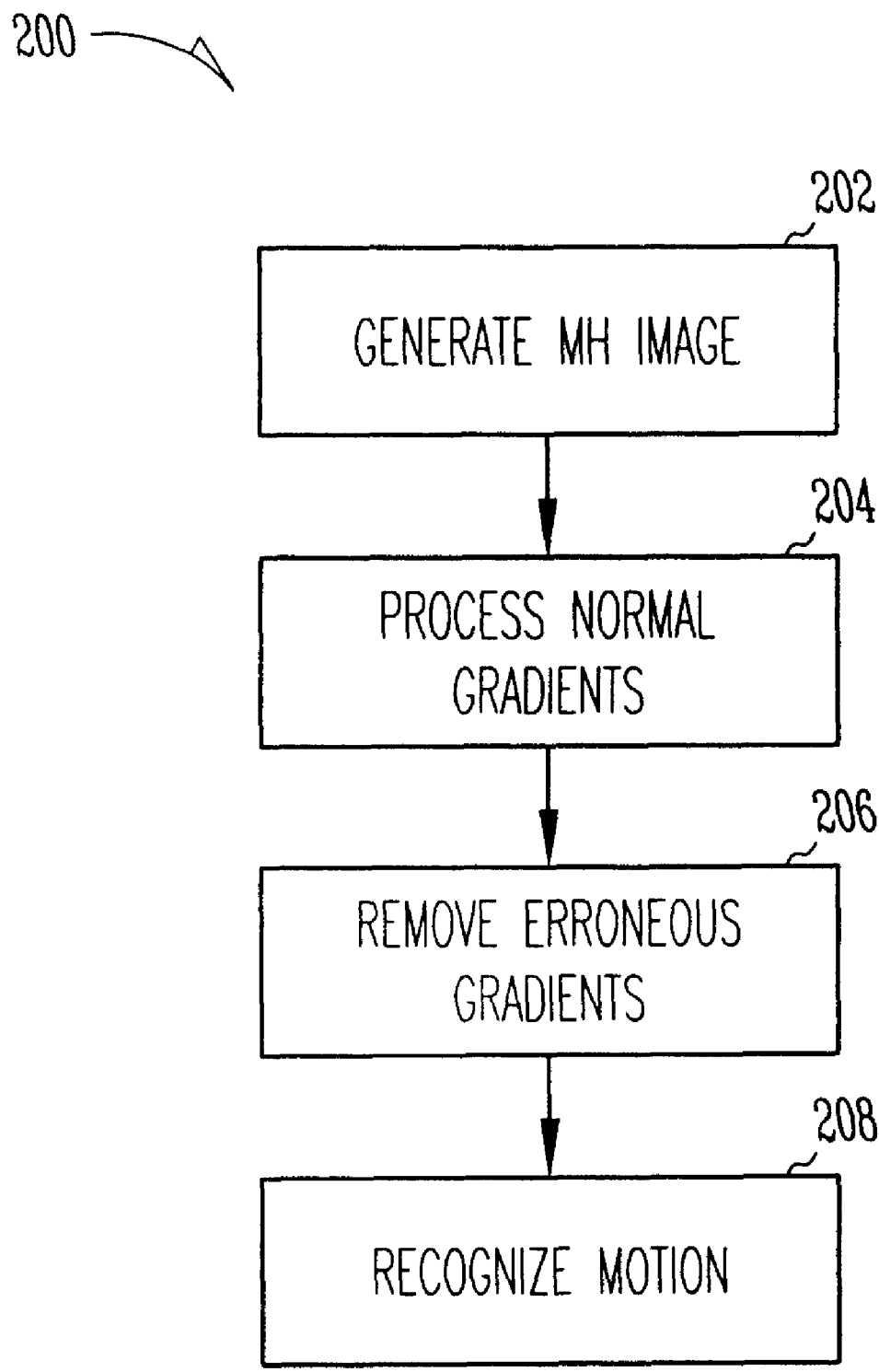
FIG. 2 is a flow chart of one embodiment of the present invention.

FIG. 2 illustrates a simplified flow chart 200 of one method of the present invention. The process includes a step 202 which generates a motion history image (MH), as explained above. The MH image is processed at step 204 to provide normal gradients of the image. Erroneous gradients are removed at step 206 using either a threshold analysis or an eroding technique. The remaining gradients are used to recognize motion at step 208.

In one embodiment step 204 is performed by applying an X and Y 3×3 Sobel operator to the silhouette pixels of the MH image. If the resulting response at a pixel location (x,y) is $S_x(x, y)$ to the X Sobel operator and $S_y(x, y)$ to the Y operator, then the orientation of the gradient is calculated as:

$$A(x, y) = \arctan(S_y(x, y)/S_x(x, y)), \quad (1)$$

and the magnitude of the gradient is:

$$M_{L2}(x, y) = \sqrt{S_x^{2}(x, y) + S_y^{2}(x, y)} \quad (2)$$

Equation (1) is applied to the MH image and identifies the direction, or angle, of the image flow. Equation (2) gives the "L2" magnitude of the vectors. Alternately, the operator applied to the NH image can be varied. Here equations (1) and (2) can be applied, but the two dimensional output is used:

$$S_x(x, y) \text{ and } S_y(x, y) \quad (3)$$

and the "L1" magnitude:

$$M_{L1}(x, y) = |S_x(x, y)| + |S_y(x, y)| \quad (4)$$

Figure 3:
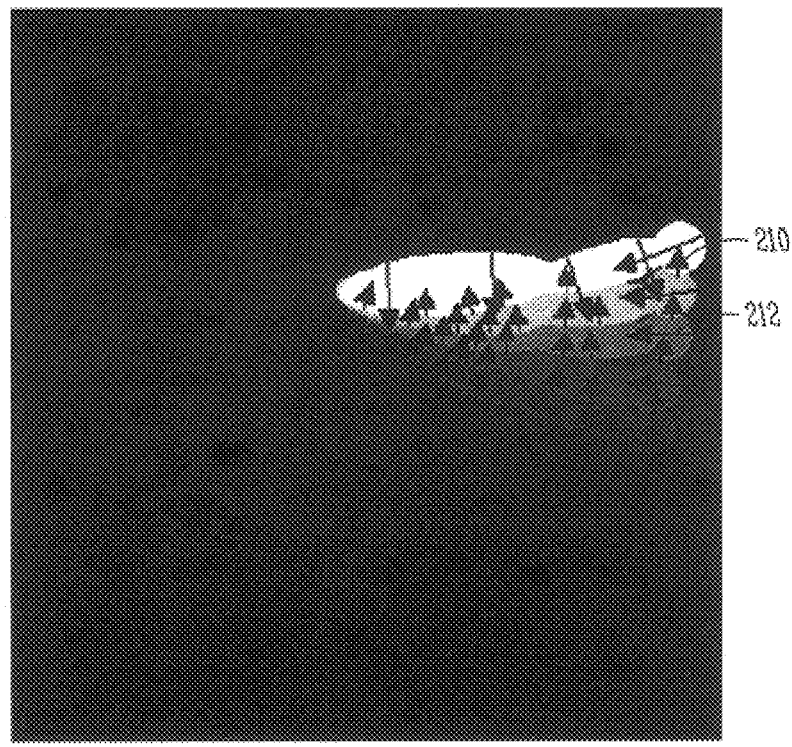
FIG. 3 illustrates normal gradients superimposed on a motion history image.

Applying the X and Y Sobel operator to the MH image gives information as to the angle and magnitude of optical flow (arrows 210) as shown here superimposed over the MH image, see FIG. 3. Equations (1) and (2) give these values directly, while equation (3) gives these values implicitly. It is noted that the boundary pixels 212 of the MH region can give incorrect motion angles and magnitudes. Interior holes in the MR region can also give incorrect flow around the boundaries of the hole. These erroneous pixels are removed at step 206, as explained below.

In one embodiment, a one dimensional histogram of equation (1) thresholded by equation (2) can be used to cut out the spurious boundary pixels. Alternatively, a two dimensional histogram of the outputs of equation (3) can be used to save computation by avoiding having to calculate the arctangent for each active pixel. As such, thresholding can also use the much faster L1 magnitude in equation (4).

Figure 4:
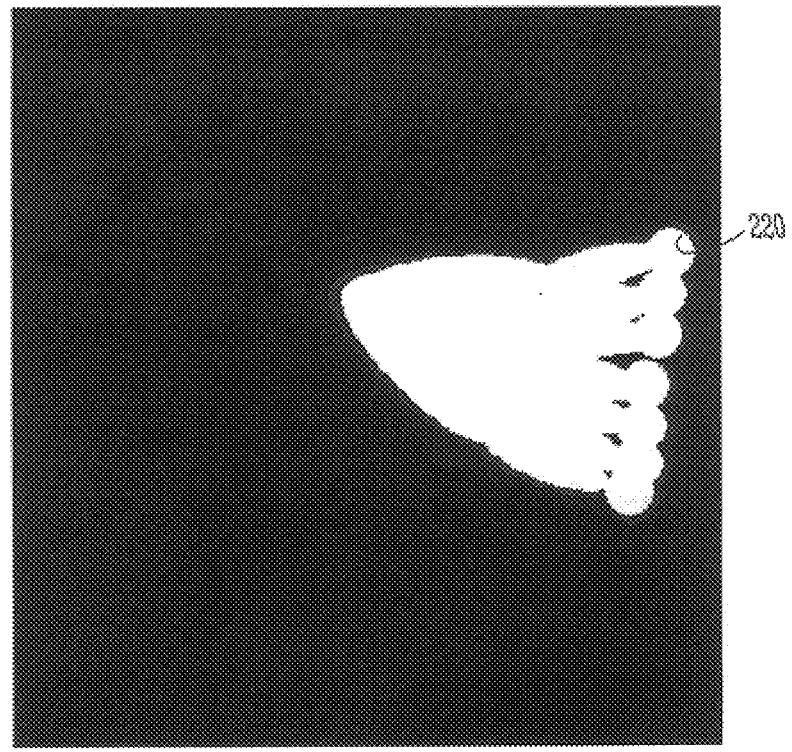
FIG. 4 illustrate a boundary mask.
Figure 5:
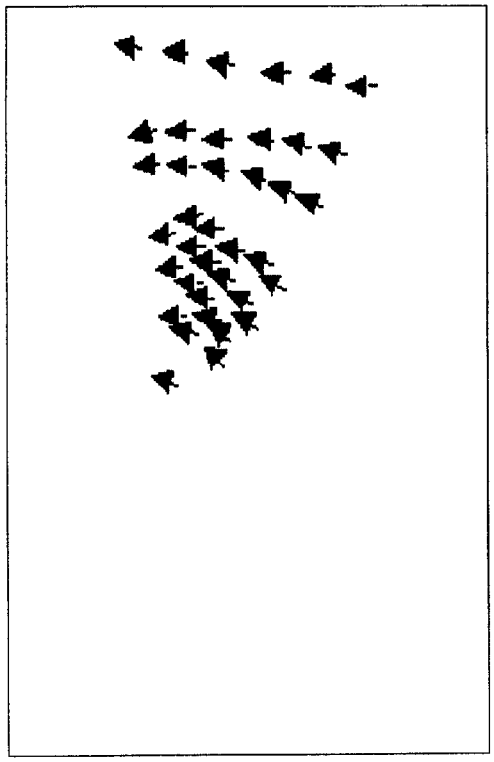
FIG. 5 illustrates normal gradients after erroneous data has been removed.

To eliminate the erroneous pixels, the boundary of the MR image from FIG. 1(*d*) can be eroded as shown in FIG. 4. Here a mask 220 is created from eroding the MR image to mask off the exterior boundary pixels and interior boundary pixels of holes in the MR image are illustrated. This process yields a cleaned up normal flow image shown in FIG. 5. Note that the MR is not illustrated in FIG. 5. The boundary mask cuts off the boundary pixels of the MR image and yields a cleaned up normal flow image. The function that implements the above algorithm can be referred to herein as approxNormalFlow (approximate normal flow) and takes a suitably normalized MH image as input to produce a NormalFlow angle image and a magnitude image as output. The "pixels" of the angle image are the angle of flow values from equation (1) and the pixels of the magnitude image are the magnitude values from equation (2). This new process is an improvement from a method that only removes motion pixels whose magnitude (equation (2) or (4)) are too large or small. That is, the threshold method is less reliable for MR images with sharp convexities or concavities since the gradient reading is unreliable there.

Figure 6B:
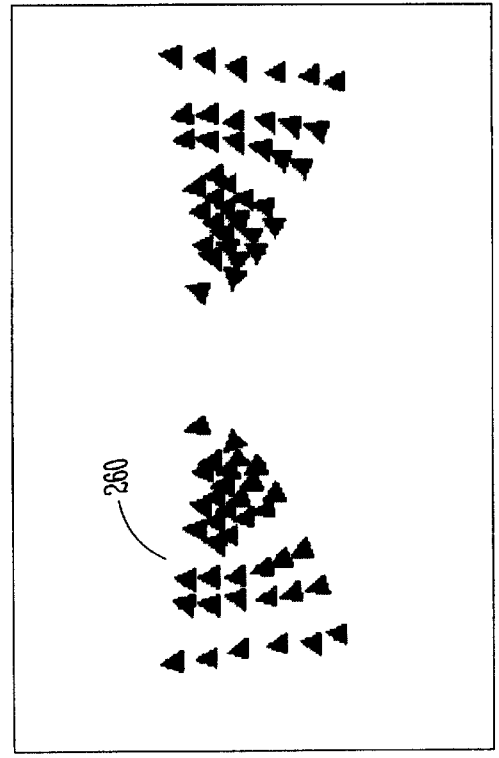
FIG. 6(b) illustrates motion gradients of FIG. 6(a)
Figure 6A:
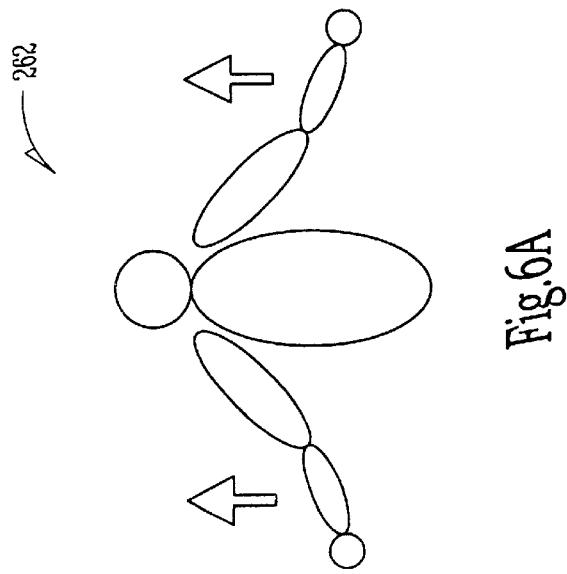
FIG. 6(a) illustrates a person raising both arms.
Figure 7:
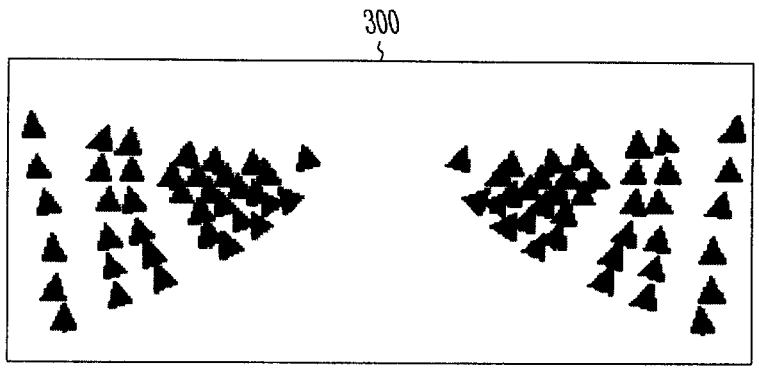
FIG. 7 is a histogram of FIG. 6(b)
Figure 8A:
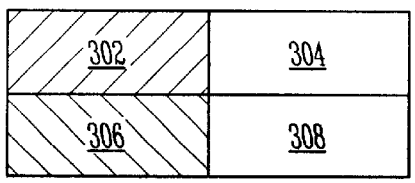
FIGS. 8(a)–(h) are different histograms of FIG. 6(b)
Figure 8B:
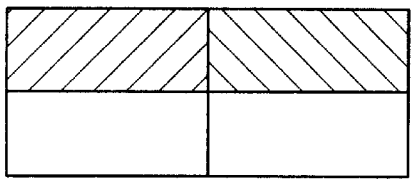
Figure 8C:
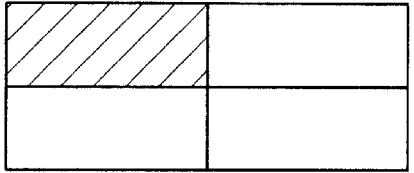
Figure 8D:
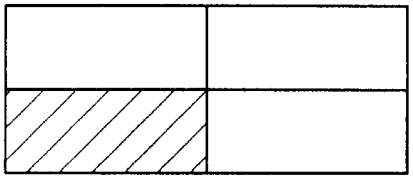
Figure 8E:
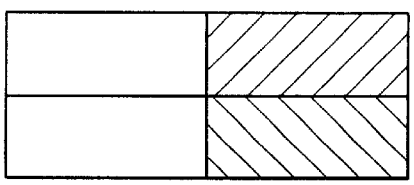
Figure 8F:
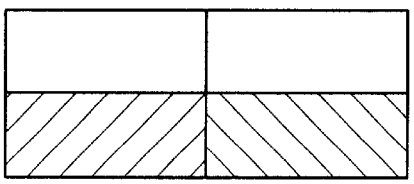
Figure 8G:
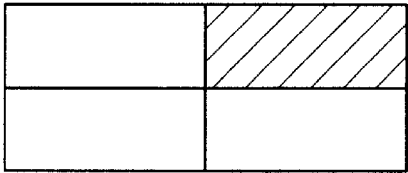
Figure 8H:
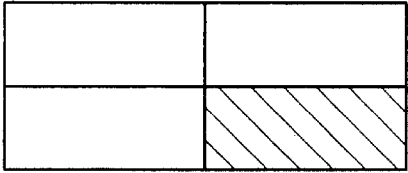

The present invention provides recognition of movement from the normal flow optical data. Referring to FIG. 6(*b*), a normal optical flow 260 that might result from a person 262 raising both arms (see FIG. 6(*a*)) is illustrated. One method of recognizing motion is illustrated in FIG. 7. Here a main histogram data-collecting region 300 is sized to the MR foreground object 262 and centered around a centroid of the object. This main histogram is then combined with sub-regions 302, 304, 306 and 308 in combinations as shown in FIGS. 8(*a*)–8(*h*) to form a single motion direction histogram data vector.

Figure 9:
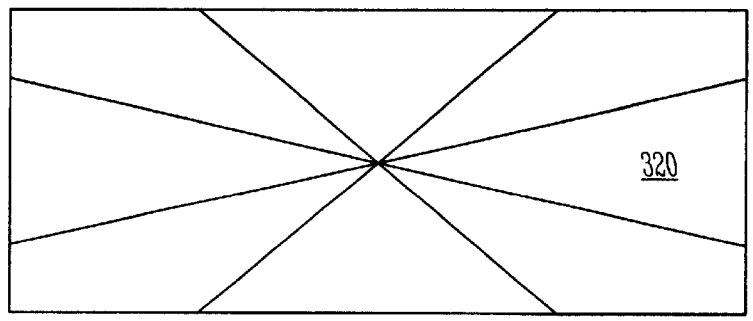
FIG. 9 is an alternate histogram of FIG. 6(b)

FIG. 9 illustrates an alternate method for collecting the motion direction into a histogram. The main motion direction data region window is sized and centered around the MR foreground object. Radial sub-regions 320 are used and more naturally catch waving type motions. As mentioned above for computational speed reasons, one method is not to code the normal optical flow directions directly in a 1D histogram as in equation (1), but to code the directions indirectly in a 2D histogram using equation (3).

An efficient histogram recognition architecture that naturally discounts noisy histogram bins by learning to accept any input in those bins (e.g. it learns noisy bins as "don't cares") is provided below. All input histograms H have their bins h normalized to form histogram Q after data collection via equation (5):

$$q_i = \frac{h_i}{\sum_k h_k}. \quad (5)$$

The (maximum wins) Chi Square ranking is between Q and a model histogram Vis:

$$\chi^2_{qv}(Q, V) = 1 - \sum_i \frac{(q_i - v_i)^2}{q_i + v_i}. \quad (6)$$

The minimum intersection measure between Q and V is:

$$\bigcap (Q, V) = \sum_i \min(q_i, v_i). \quad (7)$$

A gesture categorizer can be formed as follows:
1) Inputs Q are presented with their complement C={q,q'}, where $q_i' = 1 - q_i$.
2) Choose the best minimum intersection choice V_j among stored histogram gesture models to select category.
3) In learning mode, if no category yet exists, copy C to V_1, the first gesture model. V_1 is then labeled as the gesture that it represents.
4) If there are some existing learned gesture categories in learning mode, and new input C chooses V_j (V "wins"), and that choice is correct, then category bin weights are learned as set forth below in equation (8).
5) If new input C chooses V_k and that choice is wrong, then Chi Square via equation (6) is used to choose the next closest category until:
    (a) a "winning" category is found with minimum intersection above a threshold lambda, else
    (b) a new category is formed and set equal to C (perfect match). If (a) happens, then learning takes place via equation (8).

When a correct "winning" category is found, the learning equation is:

$$v_i^{WIN}(t) = \alpha(\min(c_i, v_i^{WIN}(t-1))) + (1-\alpha)v_i^{WIN}(t-1) \quad (8)$$

In almost all cases, alpha in equation (8) can be set to 1.0—instant learning. The above described recognition architecture automatically builds a database of histogram gesture models. Equation (8) assures monotonic learning (weights can only get smaller) so that category weights are stable (do not oscillate). In learning, categories get monotonically larger so that spurious or noisy input bins eventually get wide enough to "accept" (and therefore ignore) that bin. Equation (6) and (7) assure that new learning for a category causes minimal change to the existing learned values. In performance mode, smaller, "tighter" categories win over larger categories that cover the same input.

Figure 10B:
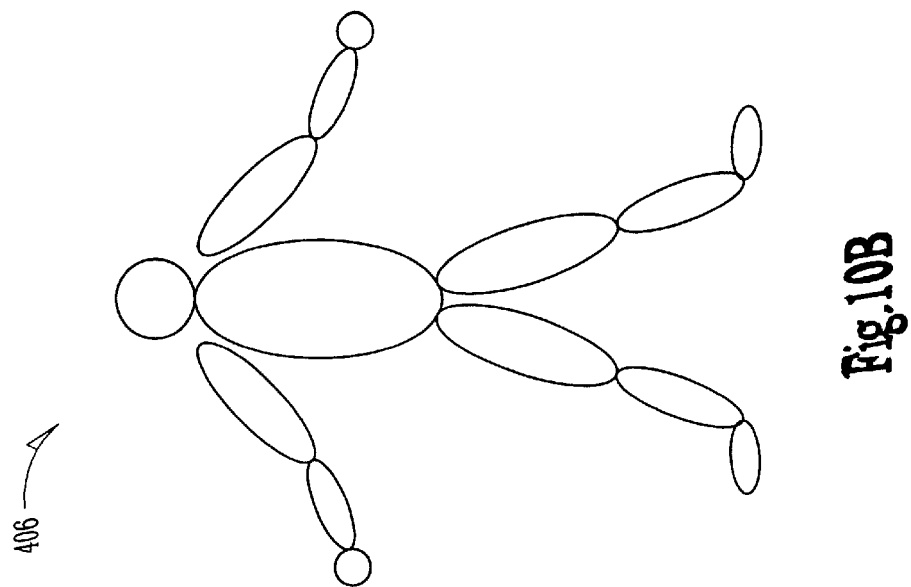
FIGS. 10a and 10b illustrate a system of an embodiment of the present invention.
Figure 10A:
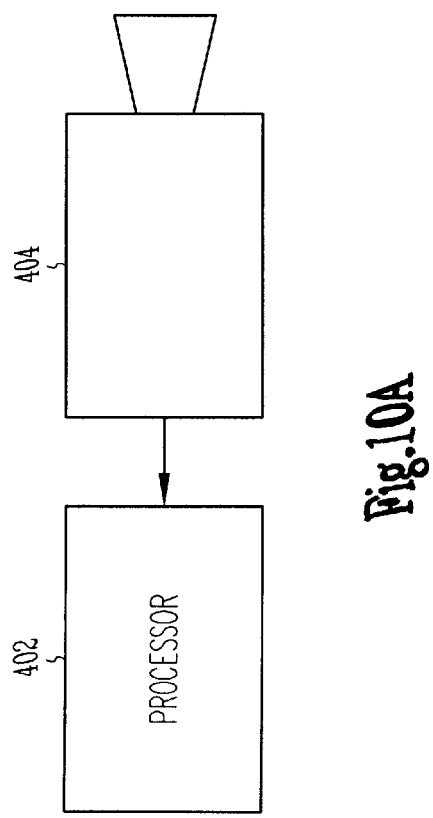

FIG. 10 illustrates a simplified system 400 implementing the present invention. The system 400 includes a processor 402 which is coupled to at least one camera 404. The camera obtains images of an object 406, as explained above. The system can be any type of machine/person interface system, such as surveillance, entertainment or safety systems. Processor 402 can be any known type of processor including a personal computer. The processor can be instructed to perform the methods described herein for detecting motion of the object. These instructions can be provided on a computer readable medium, such as magnetic or optical diskettes.

CONCLUSION

A system and method have been described which obtains images of an object and generates a motion region image of the object. The motion region image is processed to obtain normal gradients of the portion of the object that has been moved. The normal gradient data is further processed to remove erroneous data points. The erroneous data can be removed by using either an eroding method or a threshold method. After the erroneous data is removed, the remaining gradient information is used to identify a motion of the object. This can be performed using a histogram recognition operation.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A method of detecting motion comprising:

generating a plurality of silhouettes from a corresponding plurality of images taken of an object over a predetermined period of time, the plurality of images including at least three images and having time-difference information associated with sequential images of the plurality to indicate change in velocity of movement of portions of the object;

generating a motion region image of the object from the plurality of silhouettes;

calculating normal gradients over time for edges within the motion region image, the normal gradients having an orientation substantially perpendicular to motion of the edges of the silhouettes;

removing erroneous normal gradients to provide a normal flow image comprised of at least some of the normal gradients; and identifying a type of movement of the object based on the normal flow image.

2. The method of claim 1 and having a magnitude proportional to a rate of change of motion between edges of sequential silhouettes, and wherein a greater magnitude of a particular one of the normal gradients indicates a greater change in velocity associated with a portion of the object, and wherein generating the motion region image comprises:
isolating the object in the plurality of images from a background to generate the silhouettes;
generating a difference image using the plurality of images, wherein the difference image isolates a portion of the object which has changed location during the plurality of images; and
setting pixels of the difference image to an equal value to generate the motion region image, and wherein identifying includes comparing the magnitudes and the orientations of the normal gradients of the normal flow image with magnitudes and orientations of the normal gradients of the model image flows.

3. The method of claim 2 wherein removing erroneous normal gradients comprises:
removing normal gradients which have a magnitude outside a predetermined range, and wherein identifying including using the change in velocity of movement to at least in part identify the type of movement.

4. The method of claim 3 wherein calculating normal gradients comprises:
applying a Sobel operator to silhouette pixels of the motion region image to generate a response function;
obtaining the orientations of gradients of the silhouette pixels of the motion region image from the response function; and
obtaining the magnitudes of the gradients of the silhouette pixels from the response function.

5. The method of claim 4 wherein identifying movement comprises:
generating a histogram from the normal flow image, the histogram using Chi Square and minimum intersection measures; and
comparing the histogram of the normal flow image to model histograms to identify the type of movement performed by the object, wherein comparing including comparing the magnitudes and orientations of the normal gradients of the histogram with magnitudes and orientations of the normal gradients of the model histograms.

6. The method of claim 1 wherein removing erroneous normal gradients comprises:
removing normal gradients which are located in a boundary region of the motion region image, the boundary region including edges of some of the silhouettes.

7. A method of detecting motion comprising:
obtaining a plurality of at least three images of an object using a camera, the plurality of images being obtained over a predetermined period of time;
generating a motion region image of the object from the plurality of images by isolating the object in the plurality of images from a background to generate a plurality of corresponding silhouettes, generating a difference image using the plurality of images,
wherein the difference image isolates a portion of the object which has changed location during the plurality of images, and setting pixels of the difference image to an equal value;

calculating normal gradients over time of the motion region image, the normal gradients having an orientation substantially perpendicular to motion of edges of the silhouettes and having a magnitude proportional to changing velocity of motion between edges of sequential silhouettes;

removing erroneous normal gradients to provide a normal flow image; and identifying movement based on the normal flow image.

8. The method of claim 7 wherein a greater magnitude of a particular one of the normal gradients indicates a greater changing velocity associated with a portion of the object, and, wherein removing erroneous normal gradients comprises removing normal gradients which have a magnitude outside a predetermined range, and wherein identifying including using a change in velocity of movement to at least in part identify the type of movement.

9. The method of claim 7 wherein removing erroneous normal gradients comprises removing normal gradients which are located in a boundary region of the motion region image, the boundary region including edges of some of the silhouettes.

10. The method of claim 7 wherein calculating normal gradients comprises:

applying a Sobel operator to silhouette pixels of the motion region image;

obtaining an orientation of gradients of pixels of the motion region image from a response of the Sobel operator; and obtaining a magnitude of the gradients of the pixels from the response.

11. The method of claim 7 wherein identifying movement comprises:

analyzing the normal flow image using a histogram of the normal flow image, the histogram using Chi Square and minimum intersection measures; and comparing the histogram of the normal flow image to model histograms to identify a type of movement performed by the object, wherein comparing including comparing the magnitudes and orientations of the normal gradients of the histogram with magnitudes and orientations of the normal gradients of the model histograms.

12. A computer readable medium comprising instructions stored thereon that when executed by a processor result in:

generating a plurality of silhouettes from a corresponding plurality of images taken of an object over a predetermined period of time, the plurality of image including at least three images and having time-difference information associated with sequential images of the plurality, generating a motion region image of the object from the plurality of silhouettes;

calculating normal gradients for edges within the motion region image, the normal gradients hang an orientation substantially perpendicular to motion of the edges of the silhouettes and having a magnitude proportional to changing velocity of motion between edges of sequential silhouettes;

removing erroneous normal gradients to provide a normal flow image comprised of at least some of the normal gradients; and identifying a type of movement of the object based on the normal flow image.

13. The computer readable medium of claim 12 further comprising instructions, when executed by the processor to generate the motion region image further result in:

isolating the object in the plurality of images from a background to generate the silhouettes;

generating a difference image using the plurality of images, wherein the difference image isolates a portion of the object which has changed location during the plurality of images; and setting pixels of the difference image to an equal value to generate the motion region image, and wherein identifying includes comparing the magnitudes and the orientations of the normal gradients of the normal flow image with magnitudes and orientations of the normal gradients of the model image flows, and wherein a greater magnitude of a particular one of the normal gradients indicates a greater changing velocity associated with a portion of the object.

14. The computer readable medium of claim 12 further comprising instructions, that when executed by the processor remove erroneous normal gradients by removing normal gradients which have a magnitude outside a predetermined range, and wherein identifying including using the change in velocity of movement to at least in part identify the type of movement.

15. The computer readable medium of claim 12 further comprising instructions, that when executed by the processor remove erroneous normal gradients by removing normal gradients which are located in a boundary region of the motion region image, the boundary region including edges of some of the silhouettes.

16. The computer readable medium of claim 12 further comprising instructions, that when executed by the processor to calculate normal gradients further result in:

applying a Sobel operator to silhouette pixels of the motion region image to generate a response function;

obtaining the orientations of gradients of the silhouette pixels of the motion region image from the response function; and obtaining the magnitudes of the gradients of the silhouette pixels from the response function.

17. The computer readable medium of claim 12 further comprising instructions to instruct the processor to identify movement by performing a method of:

analyzing the normal flow image using a histogram of the normal flow image using Chi Square and minimum intersection measures; and comparing the histogram of the normal flow image to model histograms to identify a type of movement performed by the object.

18. A system comprising:

a camera to obtain a plurality of at least three images of the object taken over a predetermined period of time, the images having time-difference information associated therewith to indicate change in velocity of movement of portions of the object; and a processor coupled to the camera, to generate a plurality of silhouettes corresponding with the plurality of at least three images, to generate a motion region image of the object from the plurality of silhouettes, to calculate normal gradients for edges of the motion region image, to remove erroneous normal gradients to provide a normal flow image, and to identify movement based on the normal flow image using a processor, wherein the normal gradients calculated by the processor have an orientation substantially perpendicular to motion of the edges of the silhouettes.

19. The system of claim 18 wherein a greater magnitude of a particular one of the normal gradients indicates a greater change in velocity associated with a portion of the object, and wherein the processor identifies movement by comparing a histogram of the normal flow image to model histograms to identify a type of movement performed by the object, the histogram using Chi Square and minimum intersection measures, and wherein identifying including using the change in velocity of movement to at least in part identify the type of movement.

* * * * *

UNITED STATES PATENT AND TRADEMARK OFFICE
CERTIFICATE OF CORRECTION

PATENT NO. : 6,647,131 B1
DATED : November 11, 2003
INVENTOR(S) : Bradski

It is certified that error appears in the above-identified patent and that said Letters Patent is hereby corrected as shown below:

<u>Title page,</u>
Item [74], *Attorney, Agent, or Firm*, insert -- , -- after "Schwegman"; and insert -- , -- after "Lundberg".

<u>Column 11,</u>
Line 50, delete "image" and insert -- images --, therefor.
Line 53, delete "," and insert -- ; --, therefor.
Line 58, delete "hang" and insert -- having --, thereof.

Signed and Sealed this

Twentieth Day of July, 2004

JON W. DUDAS
*Acting Director of the United States Patent and Trademark Office*